US011622077B2

(12) United States Patent
Minamisawa

(10) Patent No.: US 11,622,077 B2
(45) Date of Patent: Apr. 4, 2023

(54) OPTICAL UNIT

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/666,559

(22) Filed: Feb. 8, 2022

(65) Prior Publication Data

US 2022/0256065 A1    Aug. 11, 2022

(30) Foreign Application Priority Data

Feb. 9, 2021   (JP) .............................. JP2021-019119

(51) Int. Cl.
H04N 5/232  (2006.01)

(52) U.S. Cl.
CPC ................................ H04N 5/2328 (2013.01)

(58) Field of Classification Search
None
See application file for complete search history.

(56) References Cited

U.S. PATENT DOCUMENTS

| | | | | |
|---|---|---|---|---|
| 7,881,598 B1* | 2/2011 | Wu | .......................... | G03B 3/10 396/55 |
| 8,611,735 B2* | 12/2013 | Sekimoto | ............ | H04N 5/2328 359/557 |
| 9,778,545 B2* | 10/2017 | Wade | ........................ | G02B 7/08 |
| 11,128,788 B2* | 9/2021 | Wade | ........................ | G03B 5/02 |
| 2010/0232777 A1* | 9/2010 | Tseng | ........................ | G03B 3/10 396/133 |
| 2012/0229926 A1* | 9/2012 | Wade | ........................ | G02B 7/04 359/823 |
| 2013/0314792 A1* | 11/2013 | Hu | ........................ | G02B 27/646 359/557 |
| 2015/0293372 A1* | 10/2015 | Hamada | ............... | H04N 5/2254 359/557 |
| 2015/0336211 A1* | 11/2015 | Watanabe | ............ | G02B 27/646 359/813 |
| 2017/0176766 A1* | 6/2017 | Sue | ....................... | G02B 27/646 |
| 2017/0289457 A1* | 10/2017 | Hu | ........................ | H02K 33/02 |
| 2021/0397019 A1* | 12/2021 | Sue | ........................... | G03B 5/06 |
| 2022/0086317 A1* | 3/2022 | Paik | ...................... | H04N 5/2253 |
| 2022/0102417 A1* | 3/2022 | Park | .................. | H01L 27/14636 |
| 2022/0221734 A1* | 7/2022 | Kim | ........................ | G03B 3/10 |
| 2022/0236582 A1* | 7/2022 | Minamisawa | ......... | H04N 5/232 |

FOREIGN PATENT DOCUMENTS

JP        2020034840        3/2020

* cited by examiner

Primary Examiner — Cynthia Segura
(74) Attorney, Agent, or Firm — JCIPRNET

(57) ABSTRACT

In this optical unit, a spring portion connecting a movable body to a holding body includes a first plate spring formed in a plate shape and elastically deformable in a rotation direction of the movable body relative to the holding body, and second plate springs formed in a plate shape and elastically deformable in an optical axis direction. The first plate spring and the second plate springs are separately formed. The first plate spring and the second plate spring that are separately formed are fixed to each other, and the first plate spring and the second plate spring that are separately formed are fixed to each other.

15 Claims, 7 Drawing Sheets

OPTICAL UNIT

CROSS REFERENCE TO RELATED APPLICATION

The present invention claims priority under 35 U.S.C. § 119 to Japanese Application No. 2021-019119 filed Feb. 9, 2021, the entire content of which is incorporated herein by reference.

BACKGROUND

Field of the Invention

The present invention relates to an optical unit with a shake correction function mounted in a mobile device or the like.

Description of the Related Documents

Conventionally, an optical unit with a shake correction function mounted in a mobile device or the like has been known (see, for example, Patent Document 1). The optical unit described in Patent Document 1 is provided with a movable body that includes an optical module, a fixed body that holds the movable body in a displaceable state, a rolling drive mechanism that drives the movable body relative to the fixed body around an optical axis of the optical module, and a rolling support mechanism that supports the movable body to the fixed body such that the movable body is rotatable around the optical axis. The rolling support mechanism is a plate spring. The plate spring includes a first elastic portion elastically deformable in a direction around the optical axis, and a second elastic portion elastically deformable in the optical axis direction.

In the optical unit described in JP 2020-34840 A, the first elastic portion is disposed standing at a right angle from a tip end of the second elastic portion, and the plate spring is formed in an L-shape. In addition, the plate spring is formed by bending a boundary between the first elastic portion and the second elastic portion to 90°, and the first elastic portion and the second elastic portion are formed from a single spring material. In the optical unit described in Patent Document 1, the second elastic portion elastically deformable in the optical axis direction is connected to the first elastic portion; therefore, even when an impact is applied to the optical unit in the optical axis direction, plastic deformation of the first elastic portion can be prevented. In other words, in the optical unit described in Patent Document 1, even when the impact is applied to the optical unit in the optical axis direction, plastic deformation of the plate spring can be prevented.

In the optical unit described in JP 2020-34840 A, the plate spring is formed in an L-shape including the first elastic portion elastically deformable in the direction around the optical axis and the second elastic portion elastically deformable in the optical axis direction. Therefore, as described above, even when the impact is applied to the optical unit in the optical axis direction, the plastic deformation of the plate spring can be prevented. Meanwhile, in a case where the plate spring is formed in an L-shape, the plate spring is downsized to downsize the optical unit. In such a case, it is difficult to bend the plate spring, and thus it may be difficult to manufacture the plate spring. Also, when the plate spring downsized is formed in an L-shape and the plate spring is handled as a single component, unexpected plastic deformation easily occurs in the plate spring. Consequently, handling of the plate spring as a single component becomes complicated.

At least an embodiment of the present invention provides an optical unit that includes a movable body including a camera module, a holding body holding the movable body such that the movable body is rotatable around an optical axis of the camera module, which serves as a rotation center, and a plurality of spring portions connecting the movable body to the holding body, and the optical unit can prevent plastic deformation of plate springs constituting the spring portion even when an impact is applied to the optical unit in the optical axis direction, allows for, even when the spring portion is downsized, easily manufacturing the plate springs constituting the spring portion, and allows for easily handling the plate springs when the plate springs constituting the spring portion are handled as single components.

SUMMARY

An optical unit according to at least an embodiment of the present invention includes: a movable body that includes a camera module; a holding body that holds the movable body; a rotation mechanism that rotates the movable body relative to the holding body around an optical axis of the camera module, which serves as a rotation center; and a plurality of spring portions that connect the movable body to the holding body. Each of the spring portions includes a first plate spring formed in a plate shape and elastically deformable in a rotation direction of the movable body relative to the holding body, and a second plate spring to which an end portion of the first plate spring in an optical axis direction as a direction of the optical axis of the camera module is connected. The second plate spring is formed in a plate shape and which is elastically deformable in the optical axis direction. The first plate spring and the second plate spring are separately formed. The first plate spring and the second plate spring that are separately formed are fixed to each other.

In the optical unit according to at least an embodiment of the present invention, the spring portion connecting the movable body to the holding body includes the first plate spring formed in a plate shape and elastically deformable in the rotation direction of the movable body relative to the holding body, and the second plate spring to which the end portion of the first plate spring in the optical axis direction is connected and that is formed in a plate shape and elastically deformable in the optical axis direction. Therefore, in at least an embodiment of the present invention, when an impact is applied to the optical unit in the optical axis direction, the second plate spring can be elastically deformed. As a result, plastic deformation of the first plate spring can be prevented. In other words, in at least an embodiment of the present invention, when the impact is applied to the optical unit in the optical axis direction, plastic deformation of the plate springs constituting the spring portion can be prevented.

Further, in at least an embodiment of the present invention, the first plate spring and the second plate spring are separately formed, and the first plate spring and the second plate spring that are separately formed are fixed to each other. Therefore, in at least an embodiment of the present invention, in manufacturing the first plate spring and the second plate spring, it is not necessary to perform bending work on the first plate spring and the second plate spring. Consequently, in at least an embodiment of the present invention, even when the spring portion is downsized, the first plate spring and the second plate spring can be easily manufactured. Additionally, in at least an embodiment of the present invention, the plate-shaped first plate spring and the plate-shaped second plate spring may be handled as single components. Accordingly, when the first plate spring and the second plate spring are handled as single components, the first plate spring and the second plate spring are less likely to be deformed. Therefore, in at least an embodiment of the present invention, even when the spring portion is downsized, the first plate spring and the second plate spring can be easily handled at the time of handling the first plate spring and the second plate spring as single components.

In at least an embodiment of the present invention, the optical unit is provided with, for example, four of the spring portions, and the four spring portions are disposed at approximately a 90° pitch around the optical axis of the camera module.

In at least an embodiment of the present invention, the spring portion preferably includes the second plate spring disposed on one side of the first plate spring in the optical axis direction and having a base end portion fixed to one of the movable body and the holding body, and the second plate spring disposed on the other side of the first plate spring in the optical axis direction and having a base end portion fixed to the other of the movable body and the holding body. One end portion of the first plate spring in the optical axis direction is preferably fixed to a tip end portion of the second plate spring fixed to the movable body, and the other end portion of the first plate spring in the optical axis direction is preferably fixed to a tip end portion of the second plate spring fixed to the holding body. With such a configuration, when an impact is applied to the optical unit in the optical axis direction, the second plate springs can be elastically deformed on the both sides of the first plate spring in the optical axis direction. Therefore, when the impact is applied to the optical unit in the optical axis direction, plastic deformation of the first plate spring can be effectively prevented.

In at least an embodiment of the present invention, a base end portion of the second plate spring is preferably fixed to the movable body or the holding body. The end portion of the first plate spring in the optical axis direction is preferably fixed to a tip end portion of the second plate spring. A slit-shaped cut portion into which the end portion of the first plate spring in the optical axis direction is inserted is preferably formed in the tip end portion of the second plate spring. With such a configuration, by using the cut portion, the first plate spring can be easily positioned to the second plate spring. In addition, by using the cut portion, the second can be temporarily fixed to the second plate spring. Consequently, work for fixing the end portion of the first plate spring to the tip end portion of the second plate spring can be easily performed.

In at least an embodiment of the present invention, the optical unit preferably includes a connecting portion connecting a plurality of the second plate springs disposed on one side in the optical axis direction. The connecting portion is preferably formed in a plate shape arranged in the same plane as the plurality of the second plate springs disposed on the one side in the optical axis direction. Preferably, the plurality of the second plate springs disposed on the one side in the optical axis direction and the connecting portion are integrally formed. With such a configuration, handling of the plurality of the second plate springs can be facilitated compared with a case where the plurality of the second plate springs are separated. Also, with such a configuration, fixing work for the second plate springs can be facilitated compared with a case where the plurality of the second plate springs are separated.

Additionally, even in such a case, the connecting portion is formed in a plate shape arranged in the same plane as the plurality of the second plate springs disposed on the one side in the optical axis direction, and the plate spring in which the plurality of the second plate springs and the connecting portion are integrally formed is formed in a plate shape. Therefore, the plate spring in which the plurality of the second plate springs and the connecting portion are integrally formed can be easily manufactured. In addition, at the time of handling the plate spring in which the plurality of the second plate springs and the connecting portion are integrally formed, as a single component, the plate spring can be easily handled.

In at least an embodiment of the present invention, the first plate spring preferably includes a fixed portion fixed to the second plate spring and a meandering portion connected to the fixed portion and extending in the optical axis direction while meandering. The meandering portion preferably has a wave shape formed of a plurality of linear portions and a plurality of circular arc portions, when viewed in a thickness direction of the first plate spring. With such a configuration, when an impact is applied to the optical unit, stress is less likely to be concentrated at the connection portion between the first plate spring and the second plate spring. Consequently, even in a case where the first plate spring and the second plate spring that are separately formed are fixed to each other, the connection portion between the first plate spring and the second plate spring can be prevented from being damaged when the impact is applied to the optical unit.

In at least an embodiment of the present invention, the holding body preferably includes a first intermediate member holding the movable body such that the movable body is rotatable, a second intermediate member holding the first intermediate member such that the first intermediate member is rotatable, and a fixed body holding the second intermediate member such that the second intermediate member is rotatable. The movable body is preferably rotatable to the first intermediate member around the optical axis of the camera module, which serves as a rotation center. The first intermediate member is preferably rotatable to the second intermediate member around a first direction, as a rotation axis direction, which intersects with the optical axis of the camera module. The second intermediate member is preferably rotatable to the fixed body around a second direction as a rotation axis direction, which intersects with the first direction and intersects with the optical axis of the camera module. First fulcrum portions each serving as a fulcrum point of the first intermediate member relative to the second intermediate member are preferably disposed at both end portions of the first intermediate member in the first direction. Second fulcrum portions each serving as a fulcrum point of the second intermediate member relative to the fixed body are preferably disposed at both end portions of the second intermediate member in the second direction. The spring portions are preferably dislocated from the first fulcrum portion and the second fulcrum portion in a circumferential direction around the optical axis of the camera module when viewed in the optical axis direction.

With such a configuration, compared with a case where, when viewed in the optical axis direction, the spring portions are disposed at the same positions as the first fulcrum portion and the second fulcrum portion in the circumferential direction around the optical axis of the camera module and the spring portions are disposed outward or inward of the first fulcrum portion and the second fulcrum portion in a radial direction around the optical axis of the camera module, the optical unit can be downsized in the radial direction around the optical axis.

As described above, in at least an embodiment of the present invention, in the optical unit that includes the movable body including the camera module, the holding body holding the movable body such that the movable body is rotatable around the optical axis of the camera module, which serves as the rotation center, and the plurality of the spring portions connecting the movable body to the holding body, plastic deformation of the plate springs constituting the spring portion can be prevented even when an impact is applied to the optical unit in the optical axis direction. Further, even when the spring portion is downsized, the plate springs constituting the spring portion can be easily manufactured. In addition, when the plate springs constituting the spring portion are handled as single components, the plate springs can be easily handled.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Embodiments of the present invention will be described below with reference to the drawings.

Overall Configuration of Optical Unit

Figure 1:
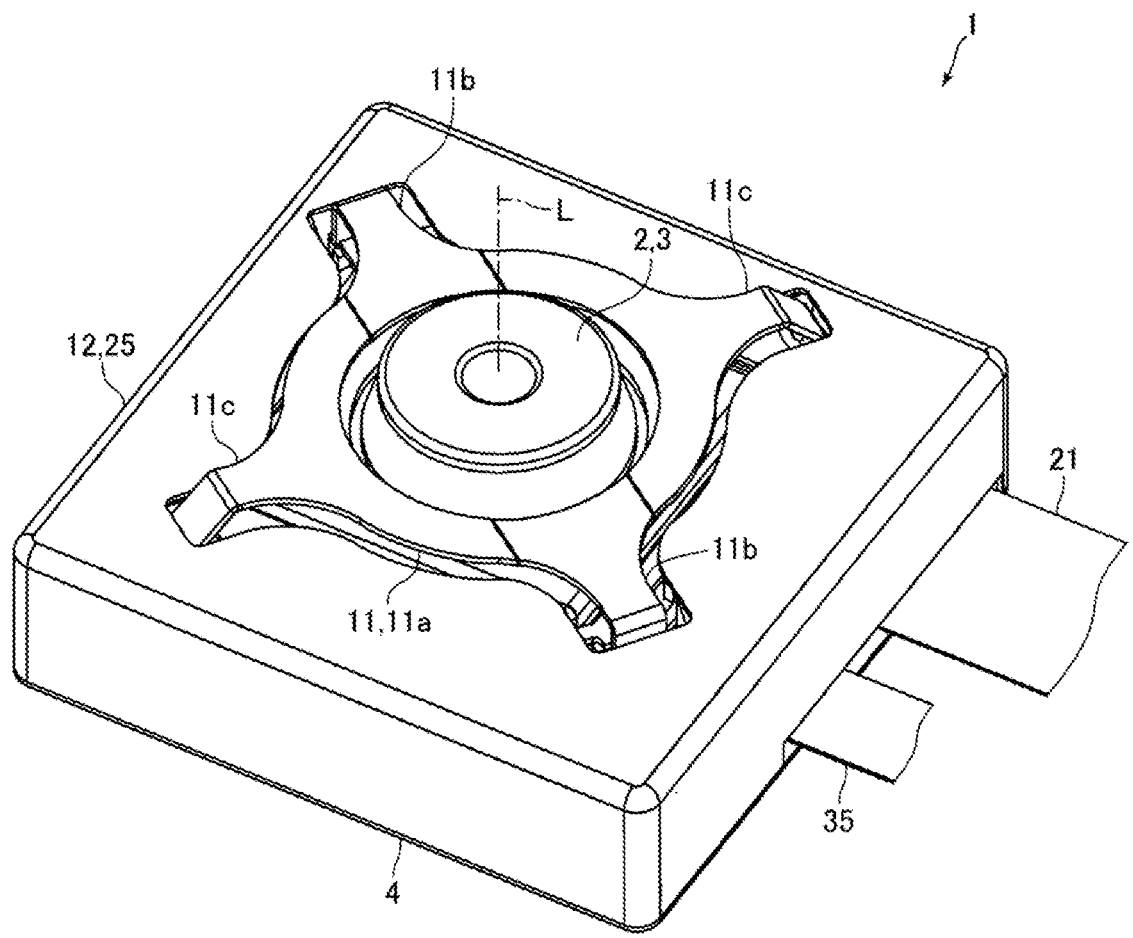
FIG. 1 is a perspective view of an optical unit according to at least an embodiment of the present invention.
Figure 1:
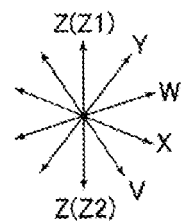
Figure 2:
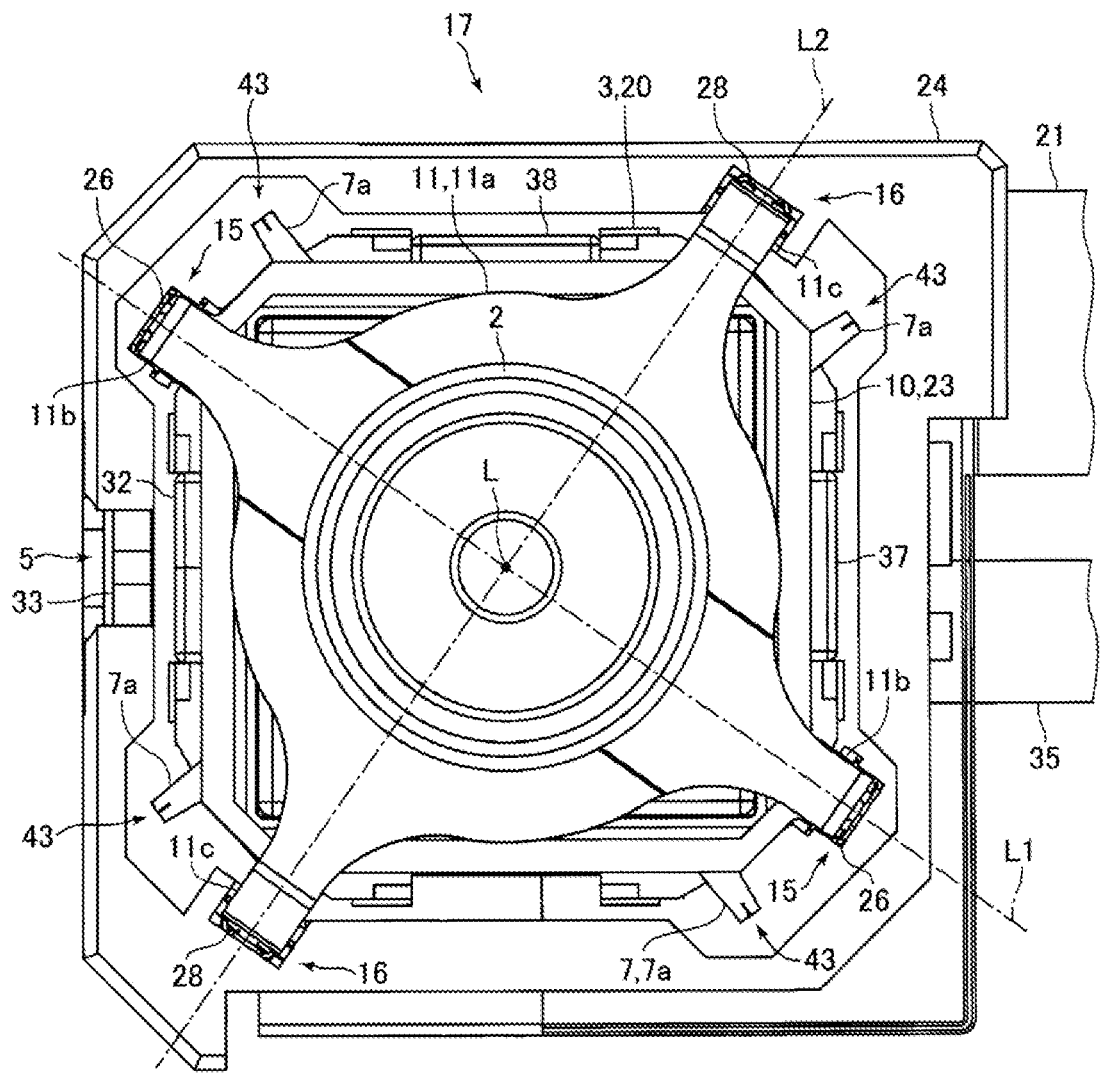
FIG. 2 is a plan view of a state where a cover member is removed from the optical unit illustrated in FIG. 1.
Figure 2:
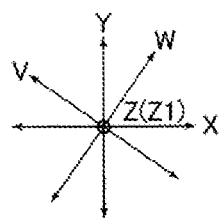
Figure 3:
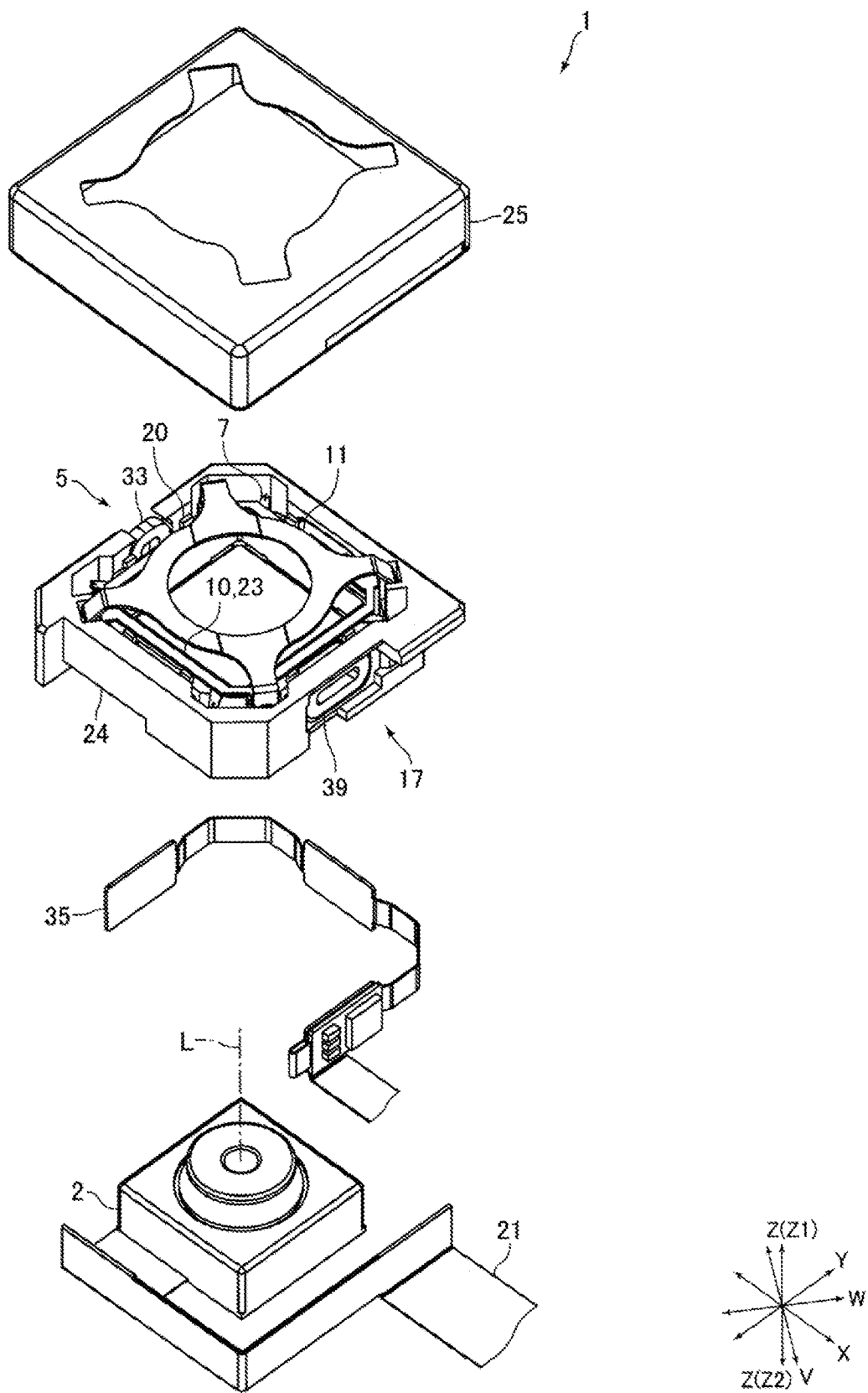
FIG. 3 is an exploded perspective view of the optical unit illustrated in FIG. 1.
Figure 4:
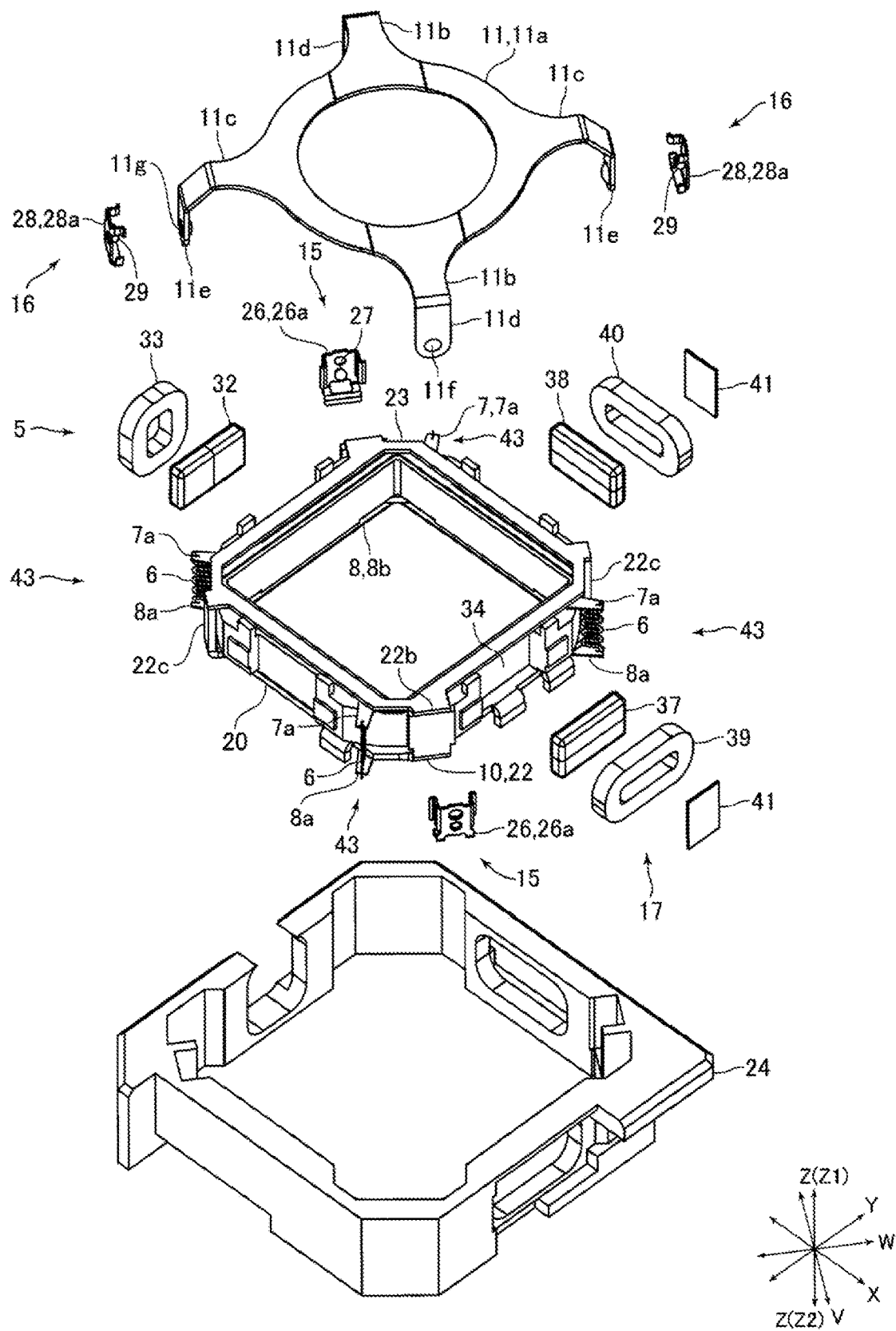
FIG. 4 is an exploded perspective view of a rotation mechanism, a second intermediate member, a case body, and the like illustrated in FIG. 3.
Figure 5:
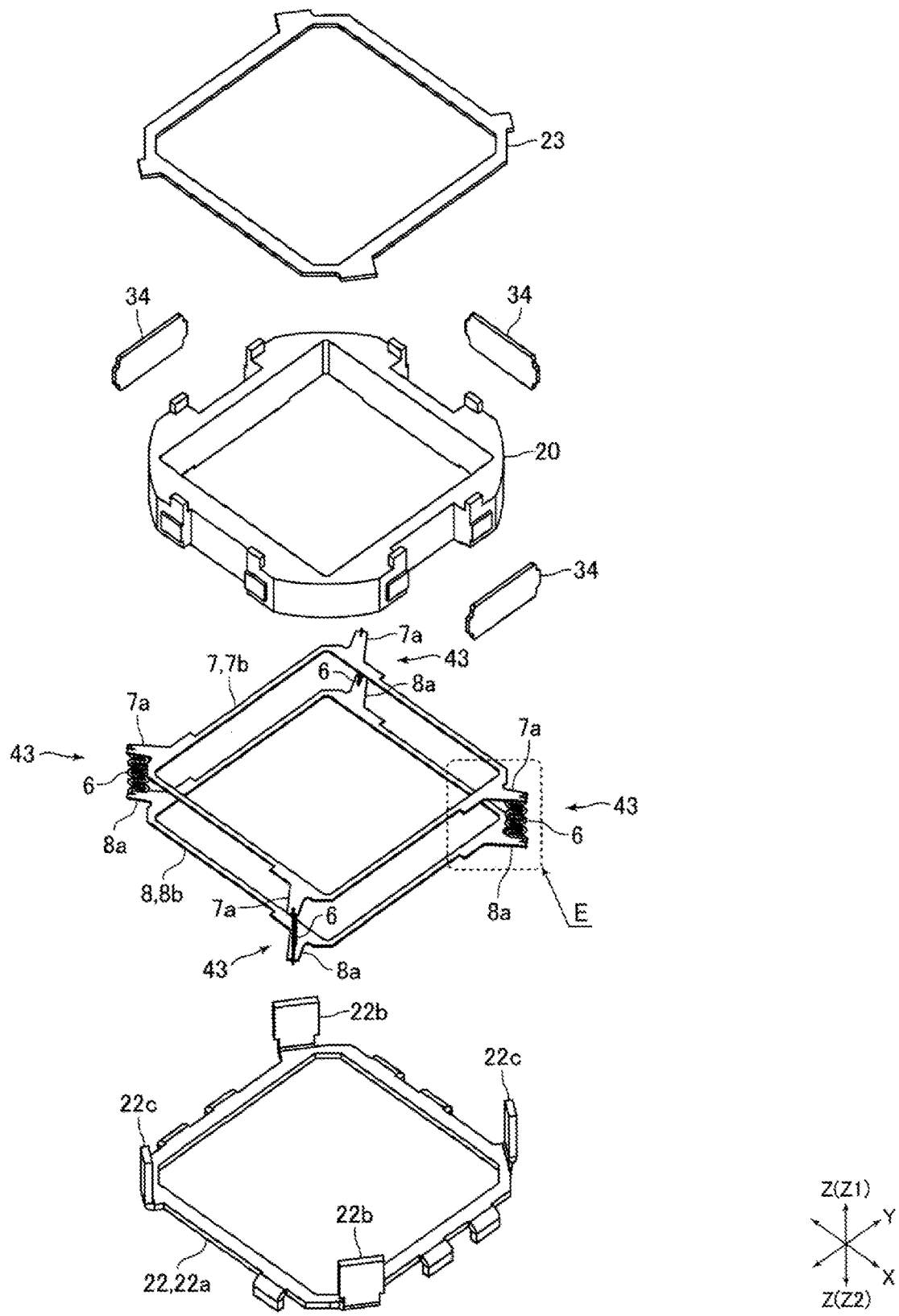
FIG. 5 is an exploded perspective view of a first intermediate member, a holder, and the like illustrated in FIG. 4.

FIG. 1 is a perspective view of an optical unit 1 according to at least an embodiment of the present invention. FIG. 2 is a plan view of a state where a cover member 25 is removed from the optical unit 1 illustrated in FIG. 1. FIG. 3 is an exploded perspective view of the optical unit 1 illustrated in FIG. 1. FIG. 4 is an exploded perspective view of a rotation mechanism 5, a second intermediate member 11, a case body 24, and the like illustrated in FIG. 3. FIG. 5 is an exploded perspective view of a first intermediate member 10, a holder 20, and the like illustrated in FIG. 4. In the following descriptions, as illustrated in FIG. 1 and the like, three mutually orthogonal directions are respectively defined as an X-direction, a Y-direction, and a Z-direction. The X-direction is a left-right direction, the Y-direction is a front-back direction, and the Z-direction is an up-down direction. Additionally, the Z1 direction side is an "upper" side and the Z2 direction side is a "lower" side.

The optical unit 1 of the present embodiment is a compact and thin unit mounted, for example, in a mobile device such as a smartphone, and is provided with a camera module 2 including a taking lens and an imaging element. The optical unit 1 is provided with a shake correction function to avoid disturbance in the captured image when shake occurs at the time of capturing images. The optical unit 1 is formed as a whole in the shape of a thin, flat, rectangular body. The thickness of the optical unit 1 is, for example, about 3 to 4 mm. The optical unit 1 of the present embodiment is formed such that the shape when viewed in an optical axis direction, which is a direction of an optical axis L of the camera module 2, is a substantially square shape. The four sides of the optical unit 1 are in parallel with a ZX plane formed of the left-right direction and the up-down direction and a YZ plane formed of the front-back direction and the up-down direction.

The optical unit 1 is provided with a movable body 3 that includes the camera module 2, a holding body 4 that holds the movable body 3, the rotation mechanism 5 that rotates the movable body 3 relative to the holding body 4 around the optical axis L as a rotation center of the camera module 2, and plate springs 6 to 8 to connect the movable body 3 to the holding body 4. The holding body 4 is provided with the first intermediate member 10 that holds the movable body 3 such that the movable body 3 is rotatable, the second intermediate member 11 that holds the first intermediate member 10 such that the first intermediate member 10 is rotatable, and a fixed body 12 that holds the second intermediate member 11 such that the second intermediate member 11 is rotatable. The movable body 3 is rotatable to the first intermediate member 10 around the optical axis L as the rotation center of the camera module 2.

The first intermediate member 10 is rotatable to the second intermediate member 11 with a first direction (V direction in FIG. 2, etc.) intersecting with the optical axis L and set as a rotation axis. In other words, the first intermediate member 10 is rotatable to the second intermediate member 11 around a first axis line L1 (see FIG. 2) having the first direction as an axial direction. The first direction of the present embodiment is orthogonal to the optical axis L. The second intermediate member 11 is rotatable to the fixed body 12 with a second direction (W direction in FIG. 2, etc.) intersecting with the first direction and intersecting with the optical axis L of the camera module 2 and set as a rotation axial direction. In other words, the second intermediate member 11 is rotatable to the fixed body 12 around a second axis line L2 (see FIG. 2) having the second direction as an axial direction. The second direction of the present embodiment is orthogonal to the first direction. Thus, a gimbal mechanism is configured between the movable body 3 and the fixed body 12.

In the present embodiment, when the first intermediate member 10 and the second intermediate member 11 are placed in predetermined reference positions, the optical axis direction of the camera module 2 is aligned with the up-down direction. Also, when the first intermediate member 10 is placed in the predetermined reference position, the second direction is orthogonal to the optical axis L. In other words, when the first intermediate member 10 is placed in the predetermined reference position and is not rotated relative to the second intermediate member 11, the second direction is orthogonal to the optical axis L. On the other hand, when the first intermediate member 10 is rotated relative to the second intermediate member 11, the second direction intersects with the optical axis L but does not intersect therewith at a right angle. The first direction is shifted counterclockwise in FIG. 2 (in a counterclockwise direction) by about 55° with respect to the front-back direction as viewed in the up-down direction. The second direction is shifted counter-clockwise in FIG. 2 by about 55° with respect to the left-right direction as viewed in the up-down direction.

First fulcrum portions 15 as rotation fulcrum points of the first intermediate member 10 with respect to the second intermediate member 11 are disposed at both end portions of the first intermediate member 10 in the first direction. Second fulcrum portions 16 as rotation fulcrum points of the second intermediate member 11 with respect to the fixed body 12 are disposed at both end portions of the second intermediate member 11 in the second direction. Further, the optical unit 1 includes a rotation mechanism 17 that rotates the movable body 3 relative to the holding body 4 around at least one of the first axis line L1 and the second axis line L2.

The movable body 3 is formed in the shape of a flat rectangular body having a thin thickness in the optical axis direction. The movable body 3 includes the holder 20 to which the camera module 2 is fixed. The holder 20 is formed of a resin material. The holder 20 is formed in a frame shape having a substantially square. An upper end surface of the holder 20 is a plane orthogonal to the optical axis direction. The camera module 2 is fixed to an inner peripheral surface of the holder 20 such that the outer circumference side of the camera module 2 is covered by the holder 20. As described above, the camera module 2 is provided with the lens and the imaging element. The imaging element is disposed at the lower end side of the camera module 2, and an object disposed on the upper side of the camera module 2 is captured by the camera module 2. A flexible printed circuit board 21 is pulled out from the lower end side of the camera module 2.

The first intermediate member 10 includes a frame member 22 and a cover plate 23 fixed to the frame member 22. The frame member 22 is formed of a metal material such as stainless steel. The frame member 22 includes a base portion 22a disposed on the lower side of the holder 20, two vertical portions 22b standing upward from the base portion 22a, and two vertical portions 22c standing upward from the base portion 22a. The base portion 22a is formed in a substantially square frame shape. In addition, the base portion 22a is formed in a plate shape. A lower surface of the base portion 22a is a plane orthogonal to the optical axis direction. The vertical portions 22b, 22c are formed in a substantially rectangular plate shape. The vertical portions 22b, 22c stand upward from the respective four corners of the base portion 22a formed in a substantially square frame shape. The thickness direction of the vertical portion 22b coincides with the first direction, and the thickness direction of the vertical portion 22c coincides with the second direction.

The cover plate 23 is formed of a metal material such as stainless steel. The cover plate 23 is formed in a substantially square frame shape. Further, the cover plate 23 is formed in a plate shape. The cover plate 23 is fixed to upper end surfaces of the vertical portions 22b, 22c. The holder 20 is disposed between the base portion 22a and the cover plate 23 in the up-down direction. The holder 20 is disposed inward of the vertical portions 22b, 22c in a radial direction around the optical axis L.

The second intermediate member 11 is formed of a metal material such as stainless steel. The second intermediate member 11 is formed by bending a metal plate having spring properties into a predetermined shape. The second intermediate member 11 includes a base portion 11a disposed above the first intermediate member 10, two arm portions 11b extending from the base portion 11a toward both sides in the first direction, and two arm portions 11c extending from the base portion 11a toward both sides in the second direction. The base portion 11a is formed in a circular frame shape. An upper end portion of the camera module 2 is disposed on the inner circumference side of the base portion 11a.

As illustrated in FIG. 4, the tip end side of each of the arm portions 11b is bent downward. A tip end portion 11d of the arm portion 11b is formed in a plate shape. The thickness direction of the tip end portion 11d is substantially coincide with the first direction. The tip end portion 11d is disposed outward of the vertical portion 22b in the first direction. The tip end side of each of the arm portions 11c is bent downward. A tip end portion 11e of the arm portion 11c is formed in a plate shape. The thickness direction of the tip end portion 11e is substantially coincide with the second direction. The tip end portion 11e is disposed outward of the vertical portion 22c in the second direction.

A recess 11f in which a portion of a sphere 27 described below, which constitutes a portion of the first fulcrum portion 15, is disposed is formed in the tip end portion 11d (see FIG. 4). The recess 11f is in formed in a hemispherical shape. The recess 11f is recessed inward in the first direction. A recess 11g in which a portion of a sphere 29 described below, which constitutes a portion of the second fulcrum portion 16, is disposed is formed in the tip end portion 11e (see FIG. 4). The recess 11g is formed in a hemispherical shape. The recess 11g is recessed inward in the second direction.

The fixed body 12 includes the frame-shaped case body 24 disposed outward of the movable body 3, the first intermediate member 10, and the second intermediate member 11 in the radial direction around the optical axis L, and the cover member 25 covering the case body 24. The case body 24 is formed of a resin material. The case body 24 is formed in a substantially square tube shape. The shape of the case body 24 when viewed in the up-down direction is a substantially square frame shape. The cover member 25 forms an upper surface, side surfaces, and the like of the optical unit 1. A through hole in which the second intermediate member 11 and the like are disposed is formed in an upper surface portion of the cover member 25.

The first fulcrum portion 15 is provided with a support member 26 fixed to the vertical portion 22b of the first intermediate member 10 and the spherical sphere 27 fixed to the support member 26 (see FIG. 4). The support member 26 and the sphere 27 are formed of a metal material. The support member 26 is provided with a plate-shaped fixing portion 26a to which the sphere 27 is fixed. The thickness direction of the fixing portion 26a is coincide with the first direction. The sphere 27 is fixed to an inner surface of the fixing portion 26a in the first direction. The sphere 27 is, for example, welded and fixed to the fixing portion 26a. The fixing portion 26a is disposed outward of the vertical portion 22b in the first direction. The tip end portion 11d of the second intermediate member 11 is disposed between the vertical portion 22b and the fixing portion 26a in the first direction. A portion of the sphere 27 is disposed in the recess 11f. The sphere 27 is in contact with a bottom surface of the recess 11f with a predetermined contact pressure due to the spring property of the arm portion 11b.

The second fulcrum portion 16 is provided with a support member 28 fixed to the case body 24 and the spherical sphere 29 fixed to the support member 28 (see FIG. 4). The support member 28 and the sphere 29 are formed of a metal material. The support member 28 is provided with a plate-shaped fixing portion 28a to which the sphere 29 is fixed. The thickness direction of the fixing portion 28a is coincide with the second direction. The sphere 29 is fixed to an inner surface of the fixing portion 28a in the second direction. The sphere 29 is, for example, welded and fixed to the fixing portion 28a. The fixing portion 28a is disposed outward of the tip end portion 11e of the second intermediate member 11 in the second direction. A portion of the sphere 29 is disposed in the recess 11g. The sphere 29 is in contact with a bottom surface of the recess 11g with a predetermined contact pressure due to the spring property of the arm portion 11c.

The rotation mechanism 5 is provided with a driving magnet 32 fixed to a side surface of the holder 20 and a driving coil 33 disposed opposed to the driving magnet 32. The driving magnet 32 is formed in a rectangular plate shape. The driving magnet 32 is fixed to one side surface of the holder 20 in the left-right direction. The driving magnet 32 is magnetized to two poles in the front-back direction. The driving coil 33 is formed by winding conductor wire around a substantially rectangular frame. The driving coil 33 is attached to a flexible printed circuit board 35. The flexible printed circuit board 35 is fixed to an outer peripheral surface of the case body 24. The driving magnet 32 and the driving coil 33 are disposed opposed to each other in the left-right direction.

The rotation mechanism 17 is provided with a driving magnets 37, 38 fixed to the side surfaces of the holder 20, a driving coil 39 disposed opposed to the driving magnet 37, and a driving coil 40 disposed opposed to the driving magnet 38. The driving magnets 37, 38 are formed in a rectangular plate shape. The driving magnet 37 is fixed to the other side surface of the holder 20 in the left-right direction. The driving magnet 38 is fixed to one side surface of the holder 20 in the front-back direction. The driving magnets 37, 38 are magnetized to two poles in the up-down direction. The driving coils 39, 40 are formed by winding conductor wire around a substantially rectangular frame. The driving coils 39, 40 are attached to the flexible printed circuit board 35. The driving magnet 37 and the driving coil 39 face each other in the left-right direction, and the driving magnet 38 and the driving coil 40 face each other in the front-back direction.

A magnetic plate 34 (see FIG. 5) made of a magnetic material is disposed between the side surface of the holder 20 to which the driving magnet 32 is fixed and the driving magnet 32. Similarly, a magnetic plate 34 is disposed between the side surface of the holder 20 to which the driving magnet 37 is fixed and the driving magnet 37, and a magnetic plate 34 is disposed between the side surface of the holder 20 to which the driving magnet 38 is fixed and the driving magnet 37. The magnetic plates 34 are fixed to the side surfaces of the holder 20.

Magnetic plates 41 (see FIG. 4) made of a magnetic material are fixed to the flexible printed circuit board 35. The magnetic plates 41 are fixed to two locations, a surface of the flexible printed circuit board 35, which is on the opposite side of a surface to which the driving coil 39 is fixed and a surface of the flexible printed circuit board 35, which is on the opposite side of a surface to which the driving coil 40 is fixed. The positions of the first intermediate member 10 and the second intermediate member 11 disposed at the reference positions are maintained by magnetic attractive force generated between the driving magnet 37 and the magnetic plate 41 and magnetic attractive force generated between the driving magnet 38 and the magnetic plate 41. In other words, the magnetic plates 41 perform the function of maintaining the postures of the first intermediate member 10 and the second intermediate member 11 when no electric current is supplied to the driving coils 39, 40.

In the optical unit 1, when a change in tilt of the movable body 3 is detected by a predetermined detection mechanism to detect the change in tilt of the movable body 3, the electric current is supplied to the driving coils 33, 39, 40 based on the detection result of the detection mechanism, and thus runout is corrected.

Structure of Plate Spring

Figure 6:
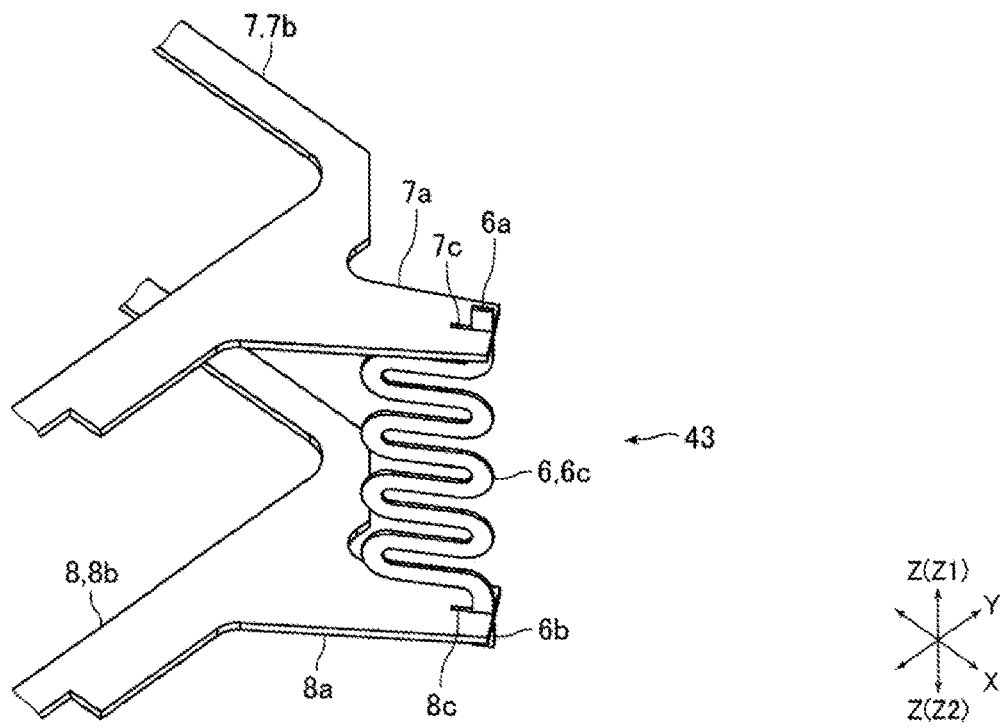
FIG. 6 is an enlarged view of part E in FIG. 5.
Figure 7:
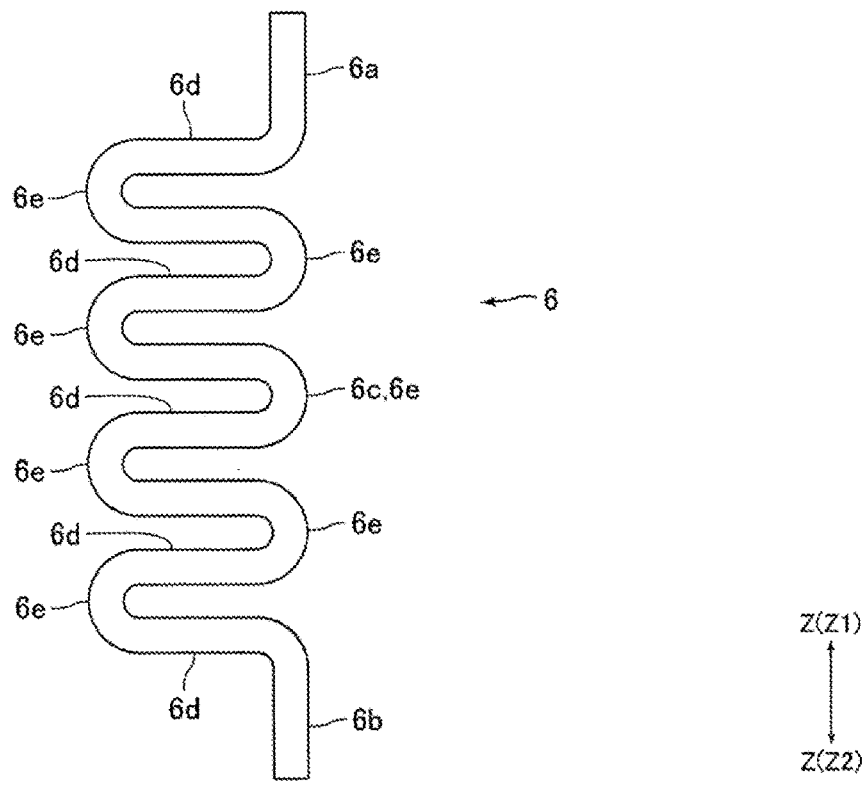
FIG. 7 is a side view of a plate spring illustrated in FIG. 6.
Figure 8:
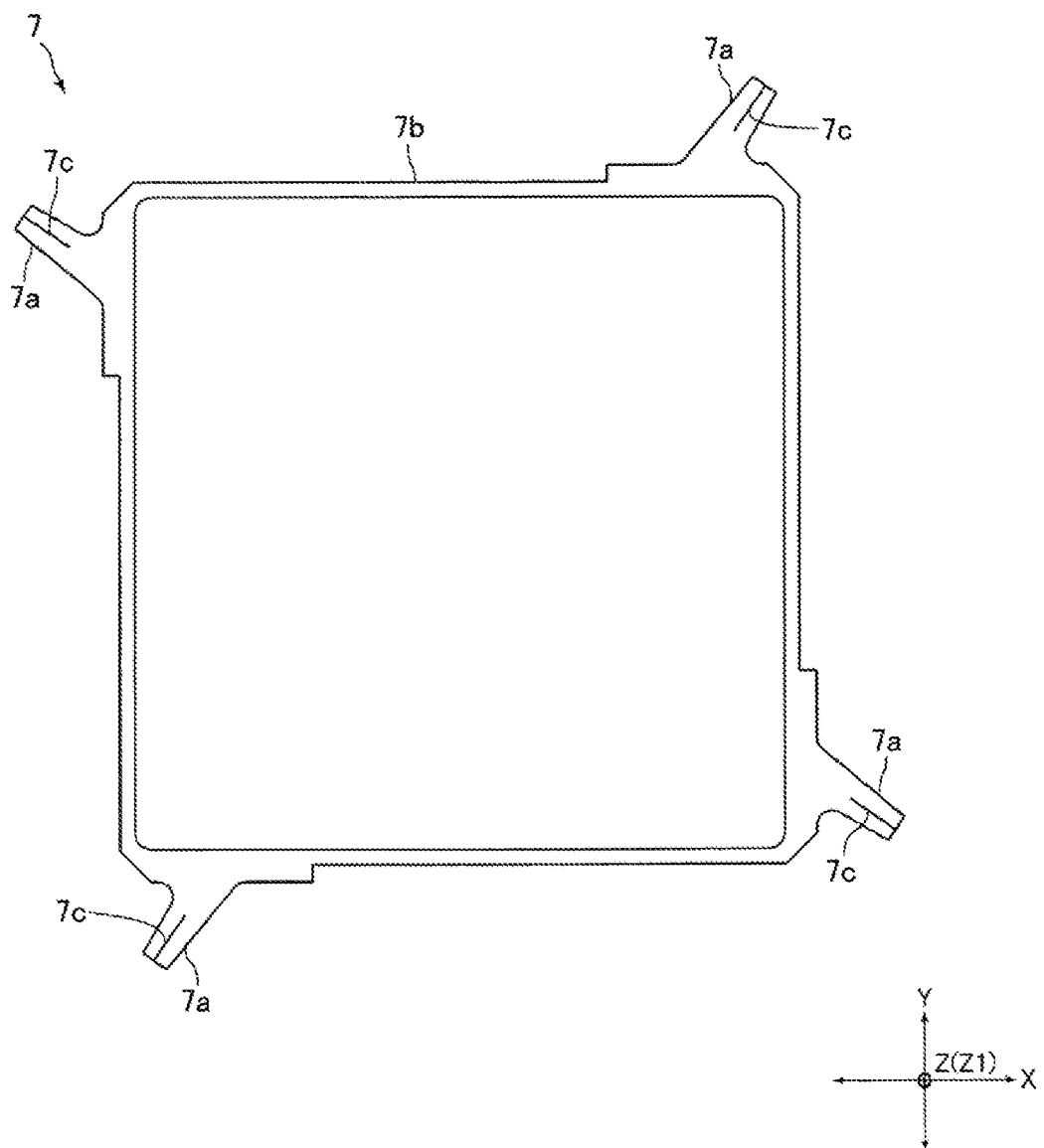
FIG. 8 is a plan view of the plate spring illustrated in FIG. 6.

FIG. 6 is an enlarged view of part E in FIG. 5. FIG. 7 is a side view of the plate spring 6 illustrated in FIG. 6. FIG. 8 is a plan view of the plate spring 7 illustrated in FIG. 6.

The optical unit 1 of the present embodiment is provided with four plate springs 6, one plate spring 7, and one plate spring 8. The plate spring 6 is made of a metal material. The plate spring 6 of the present embodiment is formed of a copper alloy. The plate spring 6 is formed in a plate shape having a thickness direction in a predetermined direction orthogonal to the optical axis direction. Specifically, the plate spring 6 is formed in a plate shape having a thickness direction in the rotation direction of the movable body 3 relative to the holding body 4 (i.e., the rotation direction of the movable body 3 around the optical axis L). The plate spring 6 is elastically deformable in the rotation direction of the movable body 3 relative to the holding body 4. Additionally, the plate spring 6 is formed in a plate-shape elongated in the optical axis direction as a whole. The thickness of the plate spring 6 is, for example, about 20 to 40 μm. Also, the width of the plate spring 6 is, for example, about 0.2 to 0.3 mm.

The four plate springs 6 are arranged at approximately a 90° pitch around the optical axis L. When the movable body 3 is arranged at the reference position, two of the four plate springs 6 are displaced counterclockwise in FIG. 2 by about 35° with respect to the front-back direction when viewed in the up-down direction, and the remaining two plate springs 6 are displaced counterclockwise in FIG. 2 by about 35° with respect to the left-right direction when viewed in the up-down direction. In addition, the plate springs 6 are disposed outward of the movable body 3 and the first intermediate member 10 in the radial direction around the optical axis L.

The plate spring 6 includes a fixed portion 6a fixed to a spring holding portion 7a described below that constitutes a portion of the plate spring 7, and a fixed portion 6b fixed to a spring holding portion 8a described below that constitutes a portion of the plate spring 8, and a meandering portion 6c connecting to the fixed portions 6a, 6b while extending and meandering in the optical axis direction. The fixed portions 6a, 6b are formed in a linear shape extending in the optical axis direction. The fixed portion 6a constitutes an upper end portion of the plate spring 6, and the fixed portion 6b constitutes a lower end portion of the plate spring 6. In other words, the fixed portion 6a constitutes one end portion of the plate spring 6 in the optical axis direction and the fixed portion 6b constitutes the other end portion of the plate spring 6 in the optical axis direction.

The meandering portion 6c is disposed between the fixed portion 6a and the fixed portion 6b. As illustrated in FIG. 7, the shape of the meandering portion 6c when viewed in the thickness direction of the plate spring 6 is a wave shape including a plurality of linear portions 6d and a plurality of circular arc portions 6e. The linear portions 6d are each formed in a linear shape extending in the radial direction around the optical axis L. The circular arc portions 6e are each formed in a semicircular shape and connects the linear portions 6d aligned in the optical axis direction. In other words, the meandering portion 6c meanders in the radial direction around the optical axis L.

The plate springs 7, 8 are formed of a metal material. The plate springs 7, 8 of the present embodiment are made of a copper alloy similar to the plate spring 6. The plate springs 7, 8 are formed in a plate shape having a thickness direction in the optical axis direction. The thickness of the plate springs 7, 8 is, for example, about 20 to 40 µm. The plate springs 7, 8 are formed in a substantially square frame shape as a whole. The plate spring 7 is fixed to the upper end surface of the holder 20. The plate spring 7 is located on the upper side of the plate spring 6. In other words, the plate spring 7 is disposed on one side of the plate spring 6 in the optical axis direction. A gap is formed between the plate spring 7 and the cover plate 23. The plate spring 8 is fixed to a lower surface of the base portion 22a of the frame member 22. The plate spring 8 is disposed on the lower side of the plate spring 6. In other words, the plate spring 8 is disposed on the other side of the plate spring 6 in the optical axis direction.

The plate spring 7 includes four spring holding portions 7a to each of which the fixed portion 6a of the plate spring 6 is connected, and a connecting portion 7b connecting the four spring holding portions 7a. In other words, the four spring holding portions 7a and the connecting portion 7b are integrally formed. In other words, the four spring holding portions 7a and the connecting portion 7b are manufactured together from a single metal plate, and the four spring holding portions 7a are integrated via the connecting portion 7b. In addition, the four spring holding portions 7a and the connecting portion 7b are arranged in the same plane. The four spring holding portions 7a protrude from portions adjacent to four corners of the plate spring 7 formed in a substantially square frame shape toward the outer peripheral side of the plate spring 7. The spring holding portions 7a are arranged at approximately a 90° pitch around the optical axis L.

In a state where the movable body 3 is disposed at the reference position, two of the four spring holding portions 7a protrude in a direction that is dislocated counterclockwise in FIG. 2 by about 35° with respect to the front-back direction when viewed in the up-down direction. Also, in a state where the movable body 3 is disposed at the reference position, the remaining two spring holding portions 7a are disposed at positions each dislocated counterclockwise in FIG. 2 by about 35° with respect to the left-right direction when viewed in the up-down direction.

A base end of the spring holding portion 7a is connected to the connecting portion 7b. The base end portion of the spring holding portion 7a and the connecting portion 7b are fixed to the upper end surface of the holder 20. In other words, the base end portion of the spring holding portion 7a and the connecting portion 7b are fixed to the movable body 3. The spring holding portion 7a is elastically deformable in the optical axis direction. A spring constant of the spring holding portion 7a in the optical axis direction is much smaller than a spring constant of the plate spring 6 in the optical axis direction. The width of the spring holding portion 7a gradually widens from the tip end toward the base end of the spring holding portion 7a.

The fixed portion 6a of the plate spring 6 is fixed to the tip end portion of the spring holding portion 7a. A slit-shaped cut portion 7c into which the fixed portion 6a is inserted is formed in the tip end portion of the spring holding portion 7a. The cut portion 7c is formed from the tip end toward the base end of the spring holding portion 7a. The fixed portion 6a is fixed to the spring holding portion 7a while being inserted into the cut portion 7c. In the present embodiment, the fixed portion 6a is fixed to the spring holding portion 7a by soldering.

The plate spring 8 is formed in the same shape as the plate spring 7. The plate spring 8 includes four spring holding portions 8a to each of which the fixed portion 6b of the plate spring 6 is connected, and a connecting portion 8b connecting the four spring holding portions 8a. In other words, the four spring holding portions 8a and the connecting portion 8b are integrally formed. In other words, the four spring holding portions 8a and the connecting portion 8b are manufactured together from a single metal plate, and the four spring holding portions 8a are integrated via the connecting portion 8b. In addition, the four spring holding portions 8a and the connecting portion 8b are arranged in the same plane. The four spring holding portions 8a protrude from portions adjacent to four corners of the plate spring 8 toward the outer peripheral side of the plate spring 8. The spring holding portions 8a are arranged at approximately a 90° pitch around the optical axis L. In a state where the movable body 3 is disposed at the reference position, the four spring holding portions 8a are overlapped with the four spring holding portions 7a in the up-down direction.

A base end of the spring holding portion 8a is connected to the connecting portion 8b. The base end portion of the spring holding portion 8a and the connecting portion 8b are fixed to the lower surface of the base portion 22a of the frame member 22. In other words, the base end portion of the spring holding portion 8a and the connecting portion 8b are fixed to the holding body 4. The spring holding portion 8a is elastically deformable in the optical axis direction. A spring constant of the spring holding portion 8a in the optical axis direction is equal to the spring constant of the spring holding portion 7a in the optical axis direction and is much smaller than the spring constant of the plate spring 6 in the optical axis direction. The width of the spring holding portion 8a gradually widens from the tip end toward the base end of the spring holding portion 8a.

The fixed portion 6b of the plate spring 6 is fixed to the tip end portion of the spring holding portion 8a. A slit-shaped cut portion 8c into which the fixed portion 6b is inserted is formed in the tip end portion of the spring holding portion 8a (see FIG. 6). The cut portion 8c is formed from the tip end toward the base end of the spring holding portion 8a. The fixed portion 6b is fixed to the spring holding portion 8a while being inserted into the cut portion 8c. In the present embodiment, the fixed portion 6b is fixed to the spring holding portion 8a by soldering.

In the present embodiment, the plate spring 6, the spring holding portion 7a of the plate spring 7, and the spring holding portion 8a of the plate spring 8 constitute a spring portion 43 that connects the movable body 3 to the holding body 4. In other words, the optical unit 1 includes four spring portions 43. The plate spring 6, the spring holding portion 7a, and the spring holding portion 8a are separately formed. In the spring portion 43, the plate spring 6, the spring holding portion 7a, and the spring holding portion 8a that are separately formed are fixed to each other. The four spring portions 43 are disposed at approximately a 90° pitch around the optical axis L. Note that "the four spring portions 43 are disposed at approximately a 90° pitch around the optical axis L" means both that the four spring portions 43 are disposed at an equal angle pitch of 90° around the optical axis L and that the four spring portions 43 are not disposed at an equal angle pitch of 90° or the like around the optical axis L.

As illustrated in FIG. 2, the spring portions 43 are displaced from the first fulcrum portion 15 and the second fulcrum portion 16 in the circumferential direction around the optical axis L when viewed in the optical axis direction. Also, the spring portions 43 are disposed substantially at the same positions as the first fulcrum portion 15 and the second fulcrum portion 16 in the radial direction around the optical axis L when viewed in the optical axis direction. In the present embodiment, the spring portions 43 hold the position of the movable body 3 disposed at the reference position in the rotation direction of the movable body 3 relative to the holding body 4. In other words, the spring portions 43 perform the function of maintaining the posture of the movable body 3 in the rotation direction of the movable body 3 relative to the holding body 4 when no electric current is supplied to the driving coil 33.

The plate spring 6 of the present embodiment is a first plate spring that is elastically deformable in the rotation direction of the movable body 3 relative to the holding body 4. In addition, the spring holding portions 7a, 8a of the present embodiment are second plate springs to which the end portions of the plate spring 6 in the optical axis direction are connected and that are elastically deformable in the optical axis direction. Specifically, the spring holding portion 7a is the second plate spring disposed on one side of the plate spring 6 in the optical axis direction and having the base end portion that is fixed to the movable body 3. The spring holding portion 8a is the second plate spring disposed on the other side of the plate spring 6 in the optical axis direction and having the base end portion that is fixed to the holding body 4.

Main Advantages of Present Embodiment

As described above, in the present embodiment, the spring portion 43 connecting the movable body 3 to the holding body 4 includes the spring portion 6 formed in a plate-shape and elastically deformable in the rotation direction of the movable body 3 relative to the holding body 4, and the spring holding portions 7a, 8a to which the end portions of the plate spring 6 in the optical axis direction are connected and that are formed in a plate-shape and elastically deformable in the optical axis direction. Additionally, in the present embodiment, the spring constants of the spring holding portions 7a, 8a in the optical axis direction are much smaller than the spring constant of the plate spring 6 in the optical axis direction. Therefore, in the present embodiment, when an impact is applied to the optical unit 1 in the optical axis direction, the spring holding portions 7a, 8a can be elastically deformed. As a result, plastic deformation of the plate spring 6 can be prevented.

In particular, in the present embodiment, one end portion of the plate spring 6 in the optical axis direction is connected to the spring holding portion 7a, and the other end portion of the plate spring 6 in the optical axis direction is connected to the spring holding portion 8a. When an impact is applied to the optical unit 1 in the optical axis direction, the spring holding portions 7a, 8a can be elastically deformed on the both sides of the plate spring 6 in the optical axis direction. Therefore, in the present embodiment, when the impact is applied to the optical unit 1 in the optical axis direction, plastic deformation of the plate spring 6 can be effectively prevented.

In the present embodiment, the plate-shaped plate spring 6, the plate-shaped plate spring 7, and the plate-shaped plate spring 8 are separately formed. The plate spring 6 and the plate spring 7 that are separately formed are fixed to each other, and the plate spring 6 and the plate spring 8 that are separately formed are fixed to each other. Therefore, in the present embodiment, in manufacturing the plate springs 6 to 8, it is not necessary to perform bending work on the plate springs 6 to 8. Consequently, in the present embodiment, even when the spring portion 43 is downsized, the plate springs 6 to 8 can be easily manufactured. Additionally, in the present embodiment, each of the plate-shaped plate springs 6 to 8 may be handled as a single component. Accordingly, when the plate springs 6 to 8 are handled as single components, the plate springs 6 to 8 are less likely to be deformed. Therefore, in the present embodiment, even when the spring portion 43 is downsized, the plate springs 6 to 8 can be easily handled at the time of handling the plate springs 6 to 8 as single components.

In the present embodiment, the slit-shaped cut portion 7c into which the fixed portion 6a of the plate spring 6 is inserted is formed in the tip end portion of the spring holding portion 7a. The slit-shaped cut portion 8c into which the fixed portion 6b of the plate spring 6 is inserted is formed in the tip end portion of the spring holding portion 8a. Therefore, in the present embodiment, by using the cut portions 7c, 8c, the plate spring 6 can be easily positioned to the spring holding portions 7a, 8a. In addition, by using the cut portions 7c, 8c, the plate spring 6 can be temporarily fixed to the spring holding portions 7a, 8a. Consequently, in the present embodiment, work for fixing the fixed portions 6a, 6b to the tip end portions of the spring holding portions 7a, 8a can be easily performed.

In the present embodiment, the four spring holding portions 7a are integrated via the connecting portion 7b. Therefore, in the present embodiment, handling of the four spring holding portions 7a can be facilitated and fixing work for the four spring holding portions 7a can be facilitated compared with a case where the four spring holding portions 7a are separated. Similarly, in present embodiment, the four spring holding portions 8a are integrated via the connecting portion 8b. Therefore, handling of the four spring holding portions 8a can be facilitated and fixing work for the four spring holding portions 8a can be facilitated compared with a case where the four spring holding portions 8a are separated.

In the present embodiment, the plate spring 6 includes the meandering portion 6c disposed between the fixed portion 6a and the fixed portion 6b, and the meandering portion 6c extends in the optical axis direction while meandering. Therefore, in the present embodiment, when an impact is applied to the optical unit 1, stress is less likely to be concentrated at the connection portion between the fixed portion 6a and the spring holding portion 7a and at the connection portion between the fixed portion 6b and the spring holding portion 8a. Consequently, in the present embodiment, the fixed portion 6a of the plate spring 6 and the spring holding portion 7a of the plate spring 7 separately formed from the plate spring 6 are fixed to each other, and the fixed portion 6b of the plate spring 6 and the spring holding portion 8a of the plate spring 8 separately formed from the plate spring 6 are fixed to each other. Even in such a case, when an impact is applied to the optical unit 1, the connection portion between the fixed portion 6a and the spring holding portion 7a and the connection portion between the fixed portion 6b and the spring holding portion 8a can be prevented from being damaged.

In the present embodiment, the spring portions 43 are displaced from the first fulcrum portion 15 and the second fulcrum portion 16 in the circumferential direction around the optical axis L when viewed in the optical axis direction. Therefore, in the present embodiment, compared with a case where the spring portions 43 are disposed at the same positions as the first fulcrum portion 15 and the second fulcrum portion 16 in the circumferential direction around the optical axis L when viewed in the optical axis direction and the spring portions 43 are disposed outward or inward of the first fulcrum portion 15 and the second fulcrum portion 16 in the radial direction around the optical axis L, the optical unit 1 can be downsized in the radial direction around the optical axis L.

Other Embodiments

The embodiment described above is an example of the preferred embodiment of the present invention, but is not limited thereto, and various modifications can be made without changing the scope of the present invention.

In the aforementioned embodiment, as long as the plate spring 6 is elastically deformable in the rotation direction of the movable body 3 relative to the holding body 4, the thickness direction of the plate spring 6 may be slightly inclined to the rotation direction of the movable body 3 relative to the holding body 4. Also, in the aforementioned embodiment, when the spring holding portion 7a is elastically deformable in the optical axis direction, the thickness direction of the spring holding portion 7a may be slightly inclined to the optical axis direction. Similarly, when the spring holding portion 8a is elastically deformable in the optical axis direction, the thickness of the spring holding portion 8a may be slightly inclined to the optical axis direction.

In the aforementioned embodiment, the meandering portion 6c of the plate spring 6 may include a plurality of linear portions extending in the optical axis direction and a plurality of circular arc portions each having a circular arc shape and connecting the linear portions aligned in the radial direction around the optical axis L. Further, in addition to the meandering portion 6c, the plate spring 6 may include a base portion formed in a rectangular shape, an elliptical shape, an oval shape, or the like. In this case, an through-hole extending through the base portion may be formed in the base portion, or a slit-shaped groove may be formed in the base portion. Also, the whole of the plate spring 6 may be formed in a rectangular shape, an elliptical shape, an oval shape, or the like. In this case, a through-hole or a slit-shaped groove extending through the plate spring 6 may be formed in the plate spring 6.

In the aforementioned embodiment, the spring holding portion 7a may be formed in a forked shape. Similarly, the spring holding portion 8a may be formed in a forked shape. Further, in the aforementioned embodiment, the plate spring 7 may include two spring holding portions 7a and a connecting portion connecting the two spring holding portions 7a. In this case, the optical unit 1 is provided with the two plate springs 7. Similarly, the plate spring 8 may include two spring holding portions 8a and a connecting portion connecting the two spring holding portions 8a. In this case, the optical unit 1 is provided with the two plate springs 8. Furthermore, in the aforementioned embodiment, the four spring holding portions 7a do not have to be connected. In other words, the four spring holding portions 7a may be separated. Similarly, the four spring holding portions 8a may be separated. In addition, in the aforementioned embodiment, the shape of the plate spring 7 may be different from the shape of the plate spring 8.

In the aforementioned embodiment, the fixed portion 6a may be fixed to the spring holding portion 7a by welding or bonding. Similarly, the fixed portion 6b may be fixed to the spring holding portion 8a by welding or bonding. Further, in the aforementioned embodiment, the plate spring 7 may be fixed to the holding body 4 and the plate spring 8 may be fixed to the movable body 3. Furthermore, in the aforementioned embodiment, the number of spring portions 43 included in the optical unit 1 may be three or five or more spring portions. In this case, the plurality of spring portions 43 may be disposed, for example, at an equal angular pitch around the optical axis L.

In the aforementioned embodiment, the optical unit 1 does not have to be provided with the plate spring 8. In this case, the fixed portion 6b is fixed to the frame member 22. Also, in this case, the plate spring 6 and the spring holding portion 7a of the plate spring 7 constitute the spring portion 43. Additionally, in the aforementioned embodiment, the optical unit 1 does not have to be provided with the plate spring 7. In this case, the fixed portion 6a is fixed to the holder 20. Also, in this case, the plate spring 6 and the spring holding portion 8a of the plate spring 8 constitute the spring portion 43.

In the aforementioned embodiment, the spring portions 43 may be disposed at the same positions as the first fulcrum portion 15 and the second fulcrum portion 16 in the circumferential direction around the optical axis L when viewed in the optical axis direction. In this case, the spring portions 43 are dislocated from the first fulcrum portion 15 and the second fulcrum portion 16 in the radial direction around the optical axis L when viewed in the optical axis direction. Further, in the aforementioned embodiment, the first axis does not have to be orthogonal to the optical axis L. For example, an angle formed by the first direction and the optical axis L may be 80° or the like. Furthermore, in the aforementioned embodiment, the second direction does not have to be orthogonal to the first direction.

In the aforementioned embodiment, the camera module 2 may be provided with a rotation mechanism that rotates the lens of the camera module 2 and the imaging element around the first axis line L1 and rotates the lens and the imaging element around the second axis line L2. In this case, the first intermediate member 10 and the second intermediate member 11 are not necessary. Also, in this case, the plate spring 8 is fixed to the case body 24.

What is claimed is:

1. An optical unit, comprising:
   a movable body that comprises a camera module;
   a holding body that holds the movable body;
   a rotation mechanism that rotates the movable body relative to the holding body around an optical axis of the camera module, which serves as a rotation center; and
   a plurality of spring portions that connect the movable body to the holding body,
   wherein each of the spring portions comprises a first plate spring formed in a plate shape and elastically deformable in a rotation direction of the movable body relative to the holding body, and a second plate spring to which an end portion of the first plate spring in an optical axis direction as a direction of the optical axis of the camera module is connected, the second plate spring being formed in a plate shape and which is elastically deformable in the optical axis direction,
   the first plate spring and the second plate spring are separately formed,
   the second plate spring comprises a moveable body side second plate spring disposed on one side of the first plate spring in the optical axis direction and having a base end portion fixed to the movable body, and a holding body side second plate spring disposed on an other side of the first plate spring in the optical axis direction and having a base end portion fixed to the holding body,
one end portion of the first plate spring in the optical axis direction is fixed to a tip end portion of the moveable body side second plate spring, and
an other end portion of the first plate spring in the optical axis direction is fixed to a tip end portion of the holding body side second plate spring.

2. The optical unit according to claim 1, wherein the spring portions comprise four of the first plate springs, and
the four of the first plate springs are disposed at approximately a 90° pitch around the optical axis of the camera module.

3. The optical unit according to claim 1, wherein
a slit-shaped cut portion into which the end portion of the first plate spring in the optical axis direction is inserted is formed in a tip end portion of the second plate spring.

4. An optical unit, comprising:
a movable body that comprises a camera module;
a holding body that holds the movable body;
a rotation mechanism that rotates the movable body relative to the holding body around an optical axis of the camera module, which serves as a rotation center and
a plurality of spring portions that connect the movable body to the holding body,
wherein each of the spring portions comprises a first plate spring formed in a plate shape and elastically deformable in a rotation direction of the movable body relative to the holding body, and a second plate spring to which an end portion of the first plate spring in an optical axis direction as a direction of the optical axis of the camera module is connected, the second plate spring being formed in a plate shape and which is elastically deformable in the optical axis direction,
the first plate spring and the second plate spring are separately formed,
the first plate spring and the second plate spring that are separately formed are fixed to each other,
a connecting portion connecting a plurality of the second plate springs disposed on one side in the optical axis direction is provided,
the connecting portion is formed in a plate shape arranged in a same plane as the plurality of the second plate springs disposed on the one side in the optical axis direction, and
the plurality of the second plate springs disposed on the one side in the optical axis direction and the connecting portion are integrally formed.

5. The optical unit according to claim 4, wherein the first plate spring comprises a fixed portion fixed to the second plate spring and a meandering portion connected to the fixed portion and extending in the optical axis direction while meandering, and
the meandering portion has a wave shape formed of a plurality of linear portions and a plurality of circular arc portions, when viewed in a thickness direction of the first plate spring.

6. The optical unit according to claim 4, wherein four of the spring portions are provided, and
the four spring portions are disposed at approximately a 90° pitch around the optical axis of the camera module.

7. The optical unit according to claim 4, wherein the spring portions comprise four of the first plate springs, and the four of the first plate springs are disposed at approximately a 90° pitch around the optical axis of the camera module.

8. The optical unit according to claim 4, wherein the second plate spring comprises a moveable body side second plate spring disposed on one side of the first plate spring in the optical axis direction and having a base end portion fixed to the movable body, and a holding body side second plate spring disposed on an other side of the first plate spring in the optical axis direction and having a base end portion fixed to the holding body,
one end portion of the first plate spring in the optical axis direction is fixed to a tip end portion of the moveable body side second plate spring, and
an other end portion of the first plate spring in the optical axis direction is fixed to a tip end portion of the holding body side second plate spring.

9. The optical unit according to claim 4, wherein a base end portion of the second plate spring is fixed to the movable body or the holding body,
the end portion of the first plate spring in the optical axis direction is fixed to a tip end portion of the second plate spring, and
a slit-shaped cut portion into which the end portion of the first plate spring in the optical axis direction is inserted is formed in the tip end portion of the second plate spring.

10. An optical unit, comprising:
a movable body that comprises a camera module;
a holding body that holds the movable body;
a rotation mechanism that rotates the movable body relative to the holding body around an optical axis of the camera module, which serves as a rotation center; and
a plurality of spring portions that connect the movable body to the holding body,
wherein each of the spring portions comprises a first plate spring formed in a plate shape and elastically deformable in a rotation direction of the movable body relative to the holding body, and a second plate spring to which an end portion of the first plate spring in an optical axis direction as a direction of the optical axis of the camera module is connected, the second plate spring being formed in a plate shape and which is elastically deformable in the optical axis direction,
the first plate spring and the second plate spring are separately formed and are fixed to each other,
the holding body comprises a first intermediate member holding the movable body such that the movable body is rotatable, a second intermediate member holding the first intermediate member such that the first intermediate member is rotatable, and a fixed body holding the second intermediate member such that the second intermediate member is rotatable,
the movable body is rotatable to the first intermediate member around the optical axis of the camera module, which serves as a rotation center,
the first intermediate member is rotatable to the second intermediate member around a first direction, as a rotation axis direction, which intersects with the optical axis of the camera module,
the second intermediate member is rotatable to the fixed body around a second direction as a rotation axis direction, which intersects with the first direction and intersects with the optical axis of the camera module,
first fulcrum portions each serving as a fulcrum point of the first intermediate member to the second intermediate member are disposed at both end portions of the first intermediate member in the first direction, second fulcrum portions each serving as a fulcrum point of the second intermediate member to the fixed body are disposed at both end portions of the second intermediate member in the second direction, and the spring portions are dislocated from the first fulcrum portion and the second fulcrum portion in a circumferential direction around the optical axis of the camera module when viewed in the optical axis direction.

11. The optical unit according to claim 10, wherein four of the spring portions are provided, and the four spring portions are disposed at approximately a 90° pitch around the optical axis of the camera module.

12. The optical unit according to claim 11, wherein a connecting portion connecting a plurality of the second plate springs disposed on one side in the optical axis direction is provided, the connecting portion is formed in a plate shape arranged in a same plane as the plurality of the second plate springs disposed on the one side in the optical axis direction, and the plurality of the second plate springs disposed on the one side in the optical axis direction and the connecting portion are integrally formed.

13. The optical unit according to claim 10, wherein the spring portions comprise four of the first plate springs, and the four of the first plate springs are disposed at approximately a 90° pitch around the optical axis of the camera module.

14. The optical unit according to claim 10, wherein a connecting portion connecting a plurality of the second plate springs disposed on one side in the optical axis direction is provided, the connecting portion is formed in a plate shape arranged in a same plane as the plurality of the second plate springs disposed on the one side in the optical axis direction, and the plurality of the second plate springs disposed on the one side in the optical axis direction and the connecting portion are integrally formed.

15. The optical unit according to claim 10, wherein the first plate spring comprises a fixed portion fixed to the second plate spring and a meandering portion connected to the fixed portion and extending in the optical axis direction while meandering, and the meandering portion has a wave shape formed of a plurality of linear portions and a plurality of circular arc portions, when viewed in a thickness direction of the first plate spring.

* * * * *